United States Patent Office 3,843,472
Patented Oct. 22, 1974

3,843,472
METHOD OF STRENGTHENING AN EDGE OF A GLASS ARTICLE AND ARTICLE WITH STRENGTHENED EDGE
François Toussaint, Montignies-le-Tilleul, Pierre Laroche, Marcinelle, Jean Schottey, Montignies sur-Sambre, and Emmanuel Lambert, Brussels, Belgium, assignors to Glaverbel S.A., Watermail-Boitsfort, Belgium
Filed June 1, 1971, Ser. No. 148,847
Claims priority application Great Britain, May 21, 1971, 16,285/71
Int. Cl. C03c 27/12, 15/00, 21/00
U.S. Cl. 161—199        16 Claims

ABSTRACT OF THE DISCLOSURE

An edge of an article of glass is strengthened by initially smoothening the surface and/or the cross-sectional profile of at least a portion of the edge of the glass article by abrading same, and then subjecting the smoothened edge or portion thereof to a chemical tempering treatment and to a rectifying treatment for reducing or removing the impairment of the surface by flaws liable to cause stress concentrations when the edge is subjected to tensile loading. The rectifying treatment may take place either before or after the chemical tempering treatment. The rectifying treatment includes the step of preventing the rectifying medium from contacting at least one surface of the glass by shielding it, while providing a liquid film between each shielding member and glass underlying surface.

BACKGROUND OF THE INVENTION

The invention relates to a method of strengthening an edge of an article of glass, said method involving a chemical tempering treatment. The invention also relates to articles which have been strengthened by such method.

The edges of articles made of glass often fail to stand up satisfactorily to impacts even when the article has been chemically tempered. When a hard object knocks against the edge of a chemically tempered glass article there is a considerable risk that the edge will be dented or chipped. Such damage very seriously weakens the article, since it detracts from or destroys the benefit of the chemical tempering. In fact, the damage to the edge may extend in depth as far as or even into the interior layers of the glass which are under tensile stress, so that slight tensile force on the article will cause the article to shatter.

Glass articles must therefore be handled with care. Special precautions must be taken in warehousing, packing and transportation of the articles. All these factors have an adverse effect on the cost price of the articles.

SUMMARY OF THE INVENTION

It is an object of the invention to reduce the fragility of the edges of glass articles.

According to the present invention, the surface and/or the cross-sectional profile of at least one portion of such edge is strengthened by smoothening it by abrasion and then subjecting it to a chemical tempering treatment and also, either before or after such chemical tempering treatment, to a treatment (hereafter called a "rectifying treatment") which removes or at least reduces the impairment of the surface of the article by faults or flaws liable to cause stress concentrations of the edge under tensile loading.

Articles which have been subjected to a strengthening method according to the invention are less susceptible to damage due to indentation or chipping by impact between the article and a hard body at the treated edge portion of the article.

It is surprising that the combination of abrasion and a rectifying treatment, followed by chemical tempering produces an improvement far superior to the effect obtained when chemical tempering is preceded only by abrasion or only by a rectifying treatment. Mere abrasion, or mere elimination of surface cracks or fissures, e.g. by means of hydrofluoric acid, does not give comparable improvement in the impact resistance of the edges. For instance, if a sheet of glass cut from a glass ribbon, before being chemically tempered, is left for one hour in an aqueous solution of hydrofluoric acid, the impact resistance of the edges of the sheet after tempering is of the same order as that of a sheet which has been tempered without being previously treated with hydrofluoric acid.

DESCRIPTION OF THE PREFERRED EMBODIMENTS

The initial step in the strengthening method according to the invention is the abrasion of the edge of the glass article to smoothen or polish it. An improvement in edge strength can be achieved by the method according to the invention wherein an edge of the article is abraded so that the edge is smoothed or refined even when the abrasion does not change the cross-sectional profile of the edge. For example, in the case of a sheet of glass which has been cut from a blank of larger size, e.g., a ribbon, so that the sheet has edge faces which are perpendicular to the main faces of the sheet, the abrasion step of the method according to the invention may be a step in which such edge face is smoothened by removal of a superficial layer of glass therefrom but the edge still remains flat and perpendicular to the main faces of the sheet. Such an abrasion treatment can be very easily performed since no re-shaping of the edges is required.

In many cases however the results of the method according to the invention are much superior if the abrasion step is carried out so that the cross-sectional profile of at least one edge portion of the article is smoothened. The smoothening of a cross-sectional profile involves a reduction in the abruptness of change in direction from one position to the next along the profile. Expressed in a mathematical way, such a smoothening involves changing the cross-sectional profile of at least one portion of an edge of the article so as to enlarge the included angle between the left and right hand tangents to the profile at a given point thereof. The expression "left hand tangent and right hand tangent" denotes lines which extend in opposite directions from a given point on the profile and are tangential to the portions of the profile on opposite sides (called the "left hand" and "right hand" sides) of such a point. Thus, the left and right hand tangents to an arc of a circle at any given point thereof are in alignment, i.e., the included angle between them is 180°. The smoothening of a cross-sectional profile according to the invention may, e.g., involve changing a curved profile to a profile which is a shallower curve. However, the effect of the smoothening is of course most marked when it involves removal of a corner to form a convex bevel or even to form a plane arris which is inclined to each of the contiguous portions of the profile at an angle which is greater than the included angle of the removed corner. The above mathematical description of profile smoothening does not exclude the case where the profile which is altered or created by abrasion comprises plane facets meeting at an angle less than 180°, given that the tangent to the plane facet is regarded as coincident with the facet itself.

A valuable improvement can often be obtained by applying the abrasion treatment to a portion only of an edge of the article. For example, in the case of a glass sheet which is to be installed or incorporated in another article, e.g., a composite panel, so that only one margin of the sheet is exposed in a position which is likely to sustain impact, it may suffice to apply the abrasion treatment only to the edge which forms part of that margin of the sheet. In some cases, it may even suffice for the purposes in view to apply such abrasion treatment to only a portion of such edge. For example, such abrasion treatment may be applied to one edge face of the sheet over the whole width of such edge face but along only a portion of its length. Alternatively, the abrasion treatment may be applied along the whole length of such edge face but only on one side of the mid-plane of the sheet. Thus the term "edge" as applied to a sheet, and as used in this application, is applicable not only to an edge face of the sheet but also to an external corner between that edge face and one of the main faces of the sheet. Accordingly, in the strengthening of a sheet by a method according to the invention, the abrasion treatment may, e.g., be a treatment which merely involves rounding off such an external corner. If the abrasion is restricted to one or more edges at one side of the sheet the treatment is shortened and such a restricted abrasion may be entirely adequate, e.g., in a case in which the sheet is to be embedded or enclosed over a part of its thickness in a matrix or frame so that the edges at one side of the sheet are protected by such matrix or frame.

Preferably, the abrasion treatment is performed on an edge face over the whole width of such face. The advantage of the treatment is then manifest under impacts at any place across the edge.

In some of the most important embodiments of the invention, the abrasion treatment involves changing the cross-sectional profile of at least one portion of an edge of the article so as to convert at least one right-angled or substantially right-angled corner into a profile in which there is an included angle greater than 90° between one portion of the profile (or the tangent to that portion) and the next portion of the profile (or the tangent to that next portion). In such embodiments, the abrading step thus removes at least one corner angle in an edge profile, or enlarges the included angle of at least one corner, and the improvement in terms of edge strength resulting from the method is particularly notable.

In embodiments of particular importance for the purposes primarily in view, the profile of an edge of an article in the form of a sheet is changed so that at every point in the profile of the new edge face, and at each of the extreme end points thereof corresponding to the arris edges, the angle between the left-hand and right-hand tangents to the profile is greater than 90°.

The new profile formed by abrasion may comprise a succession of lines corresponding with successive edge facets. For example, in the case of a sheet which initially has a flat edge face normal to the main faces of the sheet, the new profile may comprise three lines bridging the opposed faces of the sheet and forming with those faces a succession of four included angles each greater than 90°. In the case that the new profile is symmetrical such angles are equal to 135°. Preferably however, the new profile by abrasion is a continuous, outwardly convex curve.

The improvement in edge strength can be determined by means of a device comprising an impacting member which is allowed to fall over a predetermined distance against the edge. The impact energy depends on the height of fall and the weight of the impacting member. The impacting member may be suspended and be allowed to swing down against the edge to be tested and the impact energy, the angle formed by the impacting member and the article, and the hardness of the impacting member can be variable.

Damages caused by an impact on the treated edge may be of three well-defined kinds: marginal denting, edge chipping characterized by a removal of glass, and shattering of the article. The impact energy required to cause damage of one of these kinds is a measure of the resistance of the article to such damage. A strengthening coefficient can be assigned to the treatment, such coefficient being equal to the ratio between the impact energies required to cause a given damage before and after applying the strengthening treatment.

A device as described has been successfully used to demonstrate that the strengthening coefficient is greater than the abrasion step removes corners or increases the included angle of corners than when the abraded edge is and remains a flat edge face.

In certain advantageous embodiments of the invention, the abraded edge is an edge face which is given a curved cross-sectional profile. For instance, the edge face can be given the form of part of a circle or parabola. The arrises separating the edge from the contiguous faces of the article are therefore effectively moved back along such faces and are therefore less exposed to impacts than if the edge face were to remain flat. The cross-sectional profile of the edge face in that case does not exhibit any corner. Such a profiling step enables the method as a whole to confer very satisfactory impact resistance on the edges of glass articles.

Advantageously the abrasion step gives the edge a cross-sectional profile in the form of a curve which extends smoothly, without corners, into the contiguous faces of the article. In other words there are no arrises. In that case the method gives the edge particularly high resistance to impacts, even to impacts at an angle. As an example, when treating a sheet edge face, the new edge face profile can be a semi-circle, or comprise a part-circular central portion merging into curves of smaller radii between such central portion and the contiguous faces of the sheet. Profiles constituted by other curves, such as portions of parabolas, are also useful.

The abrasion can be performed in a number of ways, but advantageously the abrasion is effected by means of one or more flexible abrasive strips. The use of flexible abrasive strips facilitates the treatment of the edge or edges of the articles. Due to the flexibility of the strip or strips, the edge or edges can be rapidly smoothened, even into a rather pronounced curvature.

The abrasion can be performed by means of a number of strips which are differently oriented in relation to the edge or edges to be treated. The strips can also differ in nature and in the size of the grains used.

Use can be made of backing strips made of canvas, paper, or any other suitable material carrying an abrasive coating. The abrasive material, which may be glued to the backing strips can be, e.g., alumina or emery. Advantageously, use is made of an abrasive strip containing grains of silicon carbide which will pass through a sieve No. 170, but are retained in a sieve No. 500. A number 170 sieve (nomenclature of ASTM E 11/39, 1939–1952, Part III, pages 535–541) means a sieve the sides of whose square meshes measure 88 microns, whereas for a No. 500 sieve such dimension is 31 microns.

The use of such grain sizes is advantageous on the one hand for preventing too rapid removal of material from the article giving rise to chipping of the material or to unintended facets, and on the other hand for enabling the abrasion to be effected in an acceptable time. The abrasion can, if desired, be performed in two stages, using abrasive of the grade specified in the first stage and a finer abrasive in the second stage.

In one advantageous way of performing the abrasion treatment one or more peripherally grooved grinding wheel(s) is or are used, the shape of the peripheral groove determining the shape given to the treated edge. The grinding wheel can be surfaced, e.g., with grains of silicon carbide or alumina. As an alternative a diamond grinding wheel or wheels can be used. If necessary, abrasion by means of a grinding wheel can be preceded by abrasion by means of one or more abrasive strips for initially smoothening the edge profile to prevent sharp arrises from prematurely wearing the grinding wheel.

During abrasion, the work can be wetted with a mineral oil or a mixture of oil and water. It is also satisfactory to only use water, which has the advantage of having a high cooling power.

The method according to the invention comprises, in addition to an abrasion treatment, a rectifying treatment whereby cracks or fissures in the abraded edge or edges are eliminated and/or modified. Advantageously, the rectifying treatment leaves the edge free from faults or flaws having boundary surfaces with abrupt changes in direction from one point to another point of the fault. Faults with rounded boundary surfaces, and slight and gradual surface depressions, are not so liable to cause serious stress concentrations. Such elimination or modification of faults can be performed in various ways. One way is to subject the edge or edges to a fire polishing treatment. The amount of heat required for fire polishing is not necessarily very high, since only small surface areas have to be affected at a given time. It is enough for the polishing to influence microscopic structures, i.e. microcracks. However, such treatment involves the annealing of at least portions of the polished edge(s).

Advantageously, the elimination and/or modification of cracks from at least one portion of an edge is effected by bringing the portion to be strengthened into contact with a medium containing fluorine ions. Such treatment does not involve annealing and can be performed at low temperatures, for instance, a temperature of 0-80° C.

One highly advantageous rectifying medium is an aqueous solution containing hydrofluoric acid. Another suitable agent is ammonium bifluoride. By way of example, a medium can be used comprising a fluorine compound, for instance, sodium fluoride (NaF), in the presence of sulphuric acid.

In one advantageous embodiment of the invention, the rectifying medium contains both fluorine ions and sulphuric acids, thus accelerating the rectifying treatment. Preferably, the medium contains both hydrofluoric acid and sulphuric acid.

Advantageously, the medium has a pH lower than 4. The use of a medium of sufficient acidity helps to ensure that any transparency which the treated edge or edges may have is not impaired. The use of media of lesser acidity tends to make the surface light-diffusing.

According to a recommended feature, an acid medium is used and is prevented from contacting other portions of the article surface, i.e. surface portions other than the edge or edges being treated. It is often advantageous to prevent medium from contacting the main surface areas of the article, since although the medium polishes the surface, it sometimes shows up surface defects. Although the rectifying treatment can modify defects so that they are less harmful as stress raisers the modified faults, e.g. enlarged microfaults, may be more visible. The restriction of the area subjected to acid treatment is therefore beneficial for the ultimate optical properties of the article.

Contact of the treatment medium with a given surface portion can be prevented by covering such surface portion with one or more layers of a substance or substances substantially inert to fluorine ions. Use can be made, for instance, of organic products, such as paraffin wax. After treatment has been performed with the rectifying medium, such protective substance(s) can be removed.

Advantageously, however, protection is afforded by one or more shielding bodies located over the surface portion or portions to be shielded from the rectifying medium. The use of solid shields obviates the removal of protective coating layers after treatment.

Preferably a liquid film is disposed between each shielding body and the shielded surface portion or portions, thus preventing the treatment medium from penetrating to any considerable extent between such surface portion(s) and the shield. Water films are preferably used. In such case, if a fluorine-containing medium is used, although there is a slight diffusion of fluorine ions into that portion of the water film which is adjacent the treated edge(s) of the article, such diffusion does not harm the optical quality of the shielded surface portion or portions.

In certain other advantageous embodiments of the invention, a solid filling material is disposed between the shield(s) and the surface portion(s) to be protected to prevent the treatment medium from penetrating between the shield(s) and the article. Such filling material can completely fill any gap between a said shield and the article, or such filling material can be disposed, e.g., in the form of strips, between the shield and the article merely at the margins of the shield.

In any case in which a solid shield is used it can be kept in place by means of a clamping system.

The method according to the invention can be used in mass processing and the rectifying treatment can be performed simultaneously on a plurality of articles. Advantageously, the articles are so placed side by side as to form shields in relation to one another. There is therefore no need to incur the expense of making special shields.

It is possible for example, in this way, to subject a number of sheets of glass, e.g., 10, to a rectifying treatment by holding the sheets side by side with water films between portions of the sheets to be shielded. The sheets can be clamped together by a clamping device bearing against the two end sheets. There two end sheets can be used after the treatment with the rectifying medium if their optical qualities are considered satisfactory for the purpose for which they are intended. Otherwise, such end sheets can be rejected. Alternately, shields which can be re-used a number of times can be disposed at the ends of an assembly of articles.

As already indicated, the rectifying treatment can be performed before or after chemical tempering. However, it should be noted that it is not suitable to use a fire-polishing type of rectifying treatment after chemical tempering because the compressive stresses induced by chemical tempering would become relaxed.

The method according to the invention can be applied to articles of any kind of glass. By way of example, the method can be applied to sodalime, borosilicate, phosphate, alumina-rich, borate, zirconium oxide-rich and lead glasses.

Chemical tempering as known per se involves the production of compressive surface stresses in the glass by a treatment in which ions diffuse into the surface of the glass from a contacting medium which is preferably a molten medium, e.g., a molten salt, but may be in the form of a gas, a paste or a vapor. The compressive stresses substantially increase the tensile strength of the glass.

One type of chemical tempering treatment which can be utilized comprises a substitution of ions normally present in the glass, e.g., sodium ions, by larger ions, derived from the contacting medium, at a temperature insufficiently high to permit stress relaxation to occur in the glass in the available time. In this type of tempering treatment, the larger ions diffusing into the glass may, for example, be potassium, rubidium or cesium ions.

Alternatively, the ion diffusion may comprise a substitution of ions normally present in the glass, e.g., sodium ions, by ions derived from the contacting medium, which confer a lower coefficient of thermal expansion on the surface layers of the glass, such substitution occurring at a temperature sufficiently high to permit stress relaxation to occur in the glass. In this type of chemical tempering treatment, the ions diffusing into the glass may, for example, be lithium ions.

Whatever the type of the chemical tempering, the ion diffusion can occur solely by heating or it may be promoted by a direct or alternating electric field. The diffusion can also be promoted by the use of sound or ultrasonic waves. Additionally, the tempering can be performed in two stages, each of the stages comprising the diffusion of ions of a different element into the glass. The ions exchanged are preferably alkali metal ions but they may be ions having a valence higher than 1.0. The chemical tempering can also be combined with thermal tempering and can be followed by a crystallization. The article can be tempered locally or at a particular region or regions, e.g. only at the edges or margins, or only at the major surfaces, or it can be all-over tempered either uniformly or differentially. The tempering can moveover be performed after or before completion of manufacture of the article. Before or after tempering, the articles can be covered with a layer, for instance, a hard layer or a layer with optical properties.

The invention can be applied to articles in the form of sheets and to articles having more complex shapes, such as containers.

One or more particles which have been strengthened according to the invention can be assembled with one or more other articles, e.g. one or more articles, which has or have also been strengthened according to the invention, to form still another article.

For instance, two or more sheets of a vitreous material, one of which at least being treated according to the invention can be assembled by means of one or more interposed organic sheets to form a laminate. The invention is of special potential value in such laminates They are, for example, used as glazing panels where edge strength is a very important factor. One notable example is vehicle windshields assembled from a sheet of thermoplastic, e.g. polyvinyl butyral, and two sheets of bent and chemically tempered glass whose edges have been abraded and rectified, e.g., treated with a solution of hydrofluoric acid.

The invention also relates to an article having at least one edge portion treated by a method according to the invention as hereinbefore defined.

Various specific embodiments of the invention will now be described with reference to the accompanying diagrammatic drawings.

EXAMPLE 1

The edges of a sheet of glass cut from a glass ribbon having the following composition (percentages expressed by weight):

|  | Percent |
|---|---|
| $SiO_2$ | 69 |
| $Na_2O$ | 12 |
| CaO | 6 |
| MgO | 7 |
| $Al_2O_3$ | 6 | and measuring 1.6 m. x 0.8 m. x 0.002 m., were abraded by means of an abrasive strip, 15 cm. in width, surfaced with silicon carbide grains. The size of the grains was such that they would pass through a No. 325 sieve, but would be retained by a No. 400 sieve. The length of the sides of the square meshes of such screens or sieves are 44 and 37 microns, respectively. Abrasion was performed on a machine of conventional type for this kind of operation.

Such a machine comprises, for instance, a support which enables the sheet to be kept in a horizontal plane, and a set of two pulleys around which an endless abrasive strip runs. The working run of the strip is disposed in a vertical plane. In this kind of apparatus, the operator manually displaces the edges of the sheet along the working run of the strip.

The working zone of the abrasive strip was sprayed by a water jet to cool the edges of the sheet and the machining operation lasted 3 minutes for a sheet of the aforementioned dimensions.

The abraded edges were flat and formed an angle of 90° with the main faces of the sheet, i.e., a flat edge face. After the abrasion, the main faces of the sheet of glass were covered with a layer of paraffin wax, except for a marginal zone 5 mm. wide.

The sheet of glass thus coated was then immersed in an aqueous solution comprising 5% by volume hydrofluoric acid and 6% by volume sulphuric acid in order to subject the abraded edges to a rectifying treatment. The solution was contained in a rust-resistant steel reservoir and maintained at a temperature of 24° C. After 45 minutes treatment the sheet of glass was taken out of the solution and the paraffin wax layers were removed.

In one variant way of protecting the sheet faces from the acid, a polymerized protective layer was applied by a gun to the main sheet faces. The composition applied by the gun was a vinyl acetate/vinyl chloride copolymer.

After the protective layers had dried, the portions of the protective layers covering a marginal zone 1 mm. wide on each of the main faces, and the protective layer on the edge faces of the sheet, were ground away. The sheet was then immersed in an acid of the composition above stated.

Following the rectifying treatment, the sheet was heated to a temperature of 465° C. and then immersed for 10 hours in a bath of molten $KNO_3$ at a temperature of 470° C. The sheet was then removed from the bath and cooled. During the immersion in the bath, potassium ions were substituted for sodium ions to a depth of 25 microns from the surface of the sheet. The bending strength of the sheet was thereby increased to about 58 kg./mm.$^2$, such figure being obtained by measurements of samples of glass of identical composition treated simultaneously in the same way as the sheet of glass.

Figure 1:
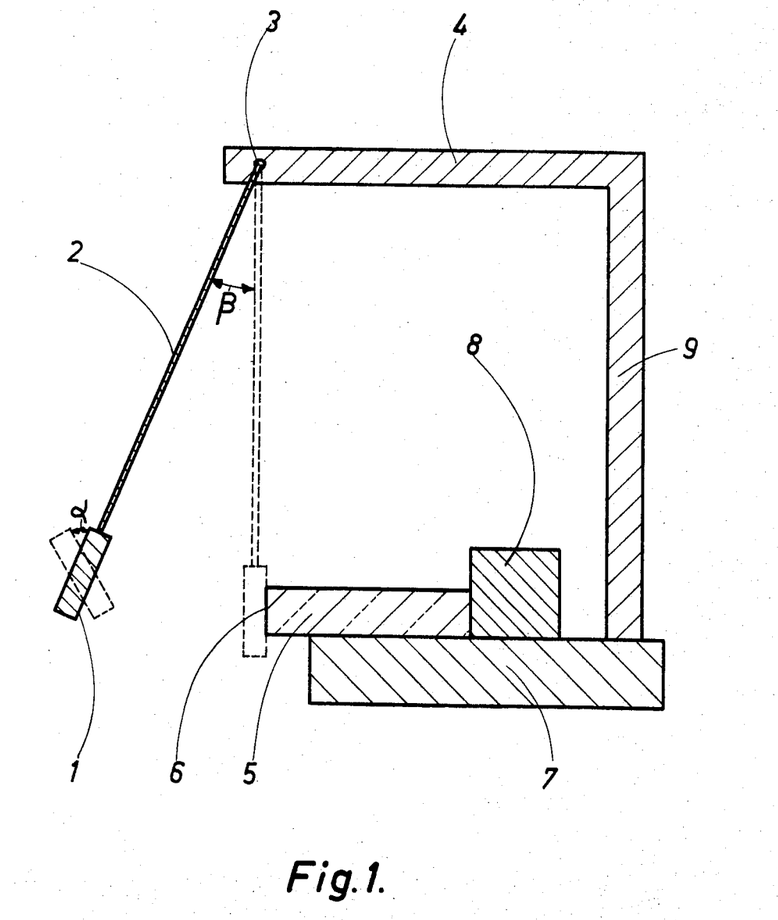
FIG. 1 is an elevation in cross-section, of a device for measuring impact resistance.

The chipping resistance of the treated sheet was measured by means of the apparatus shown in FIG. 1. The apparatus comprised an impacting member 1 suspended via a rod 2 from an arm 4 supported by an upright member 9 mounted on a base 7. The rod 2, carrying the impacting member 1, was freely pivotable around a horizontal pivot 3. The impacting member 1 is mounted on the rod 2 so that it can either be in line therewith, as illustrated, or form an angle with the rod 2. A glass sheet 5 to be tested was placed on the surface of the base 7 with one edge against a displaceable stop block 8 which was positioned so that the edge 6 of the glass sheet 5 was disposed beneath the pivot 3. Thus, when rod 2 was vertical the impacting member 1 rested against the edge 6 of the glass sheet 5 as indicated by the dashed lines.

For testing purposes the impacting member was so raised that the rod 2 formed an angle $\beta$ with the vertical, whereafter the rod and the impacting member were allowed to swing freely down under gravity, around the pivot 3, so that the impacting member struck the edge 6 of the sheet while the member 1 was moving substantially horizontally.

The effect of the impacting member depended on its hardness. The test was performed using impacting members of different hardnesses on the rod 2, for instance, members of 500 kg./mm.$^2$ or 1000 kg./mm.$^2$ Vickers hardness. The impact energy at which the edge of the sheet was chipped by a particular impacting member was recorded in terms of the angle $\beta$. The impact energy increases in function of the increase in the angle $\beta$. The method allows a comparison between the maximum impact energies required to chip the edge of a sheet treated according to the invention on the one hand and a sheet which is of identical size and composition but which has not been abraded or rectified but has been chemically tempered on the other hand. The ratio between such energies is a yardstick for measuring the strengthening effect due to the preliminary treatments. Such ratio is herein referred to as the "strengthening coefficient."

To test the sheet treated according to the present Example, use was made of an impacting member having a Vickers hardness of approximately 500 kg./mm.$^2$. The impacting member was disposed in line with the rod 2, the angle $\alpha$ between the impact member 1 and axis of the rod 2 being 0°.

The strengthening coefficient, in relation to chipping, for the sheet treated according to the invention as hereinbefore described, is 2.0. This means that the energy required to chip the edge of the treated sheet is twice as great as that required to chip the edge of a sheet of the same glass which has been chemically tempered in the same way but the edge of which has not been abraded or treated by the hydrofluoric acid solution.

The improvement in resistance to chipping is important in itself, for instance, for aesthetic reasons. However, it has the corollary effect of increasing the bending strength of the glass sheet. It was found that edge chipping caused the bending strength of the sheet to drop from 58 kg./mm.$^2$ to 7 kg./mm.$^2$.

EXAMPLE 2

Figure 2:
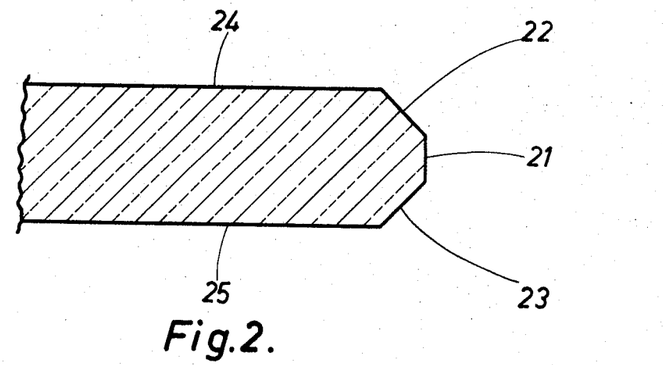
FIGS. 2 and 4 are cross-sections of portions of three different glass sheets.

The edges of a piece of sheet glass having the following composition (percentages expressed by weight):

|  | Percent |
| --- | --- |
| $SiO_2$ | 72 |
| $Na_2O$ | 14.2 |
| CaO | 8.1 |
| MgO | 4.5 |
| $Al_2O_3$ | 1.2 | and measuring 90 cm. x 130 cm. x 0.6 cm. were ground to give their outline a bevelled shape, as shown in FIG. 2.

To this end, the edges of the sheet were passed (with the sheet held horizontally) successively in front of three endless abrasive strips whose working reach was disposed vertically. The first strip comprised silicon carbide grains which will pass through a No. 170 sieve, but are retained by a No. 200 sieve. The sides of the square meshes of such sieves measure 89 and 76 microns, respectively. The second vertical strip comprised silicon carbide grains which will pass through a No. 325 sieve but not through a No. 400 sieve. The sides of the square meshes of such sieves measure 44 and 37 microns respectively. The third vertical strip comprised silicon carbide grains which will pass through a No. 400 sieve but not through a No. 500 sieve. The sides of the square meshes of such sieves measure 37 and 31 microns respectively.

Abrasion by means of these three strips resulted in a smooth flat edge face normal to the main faces of the sheet. Part of that flat face remained in the final bevelled profile and is the facet designated 21. The formation of this smooth flat edge face took 6 minutes.

To form the two other facets 22, 23, use was made of two endless abrasive strips mutually inclined at the appropriate angle (each strip being at 45° to the horizontal). The abrasive grains of these further strips were of the same sizes as the grains of the third of the strips previously described. The included angles between the successive facets 22, 21, 23 and the faces 24, 25 of the sheet were all 135°. The formation of the facets 22, 23 took 8 minutes.

After the abrasion, the sheet of glass was washed in running water and dried.

The sheet was then shielded and the four margins of the sheet were then successively subjected to a rectifying treatment by immersing for 30 minutes in an aqueous solution containing 10% by volume of hydrofluoric acid at a temperature of 22° C. As a result of the shielding, the solution simultaneously contacted a marginal zone, 10 mm. in width, of the main surfaces, as well as the bevelled edge faces.

In order to chemically temper the sheet, it was then immersed for 40 hours in a bath of molten $CsNO_3$ at 445° C. The bath contained 0.2% $Cs_2CO_3$. The tensile strength of the tempered sheet of glass was 130 kg./mm.$^2$.

Measurements were then made of the increased strengthening of the edges due to the bevelling and the contact with hydrofluoric acid, by comparing the resistance to chipping of the sheet of glass with that of a sheet of glass of identical size and composition which had not been subjected to the bevelling and rectifying treatments but which had been tempered in the same way.

For the comparison use was made of the apparatus illustrated in FIG. 1 and described in Example 1. The Vickers hardness of the impacting member was 1000 kg./mm.$^2$.

In a first test the angle $\alpha$ between the axis of the rod 2 and the impacting member 1 was 0°. The impacting face of the impacting member 1 was therefore vertical at the moment of impact with the edge face of the sheet, in this case the facet 21. It was found that the strengthening coefficient in respect of chipping was approximately 1.3 notwithstanding that in the case of the sheet treated according to the invention, due to the bevelling, the area of contact between the impacting member 1 and the sheet edge was only one third of the contact area in the case of the unbevelled sheet.

In a second test the angle $\alpha$ and 20°. Under these conditions, the impacting member 1 dropped on to the arris edge of the comparison sheet of glass not treated according to the invention. This comparison sheet was so disposed in the apparatus that it was the arris edge corresponding to the cutting line of the sheet which sustained the impact of the impacting member. The strengthening coefficient under these conditions was 3.0.

In a final test the angle $\alpha$ was 45°. The impacting face of the impacting member therefore struck one of the facets 22, 23 of the bevel of the sheet treated according to the invention, the impacting face and the facet being parallel at the moment of impact. The untreated sheet was disposed in the apparatus in the same way as in the second test. The strengthening coefficient was of the order of 100.

EXAMPLE 3

Figure 3:
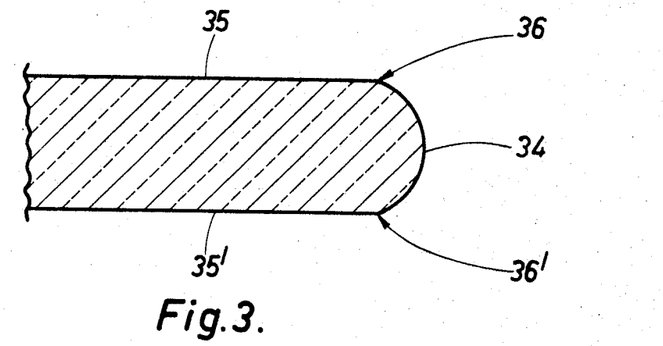

Ten sheets of glass measuring 1 m. x 1.10 m. x 0.005 m. and having the following composition (percentages by weight):

|  | Percent |
| --- | --- |
| $SiO_2$ | 69 |
| $Na_2O$ | 12 |
| CaO | 6 |
| Mgo | 7 |
| $Al_2O_3$ | 6 | were abraded at the edges in two stages. In the first stage they were given a bevelled shape by successive abrasion steps as employed in Example 2 so as to give the edges the profile shown in Figure 2. That stage took fifteen minutes. In the second stage, the edges were further abraded by a peripherally grooved diamond grinding wheel having a diameter of 11 cm. and with the peripheral groove being of semi-circular profile with a radius of curvature of 3.55 mm. while the angle of clearance was 30°. The diamond grains of the grinding wheel were of sizes such that they would pass through a No. 325 sieve but not through a No. 400 sieve. During grinding, each sheet of glass was held horizontally on a table with the edges of the sheet projecting from the edges of the table. The diamond grinding wheel was supported by a mobile arm and manually moved around the sheet, while the wheel was rotated at a peripheral speed of 1000 meters per minute. Water was sprayed onto the work at the rate of 8 liters per minute. By this treatment, each edge was given a convex curvature as shown in Figure 3, leaving arris edges 36, 36′ where the bevelled surface 34 intersected the main faces 35, 35′. The angle between each of such main faces and the tangent to the curve immediately adjacent such main face was approximately 135°.

Figure 4:
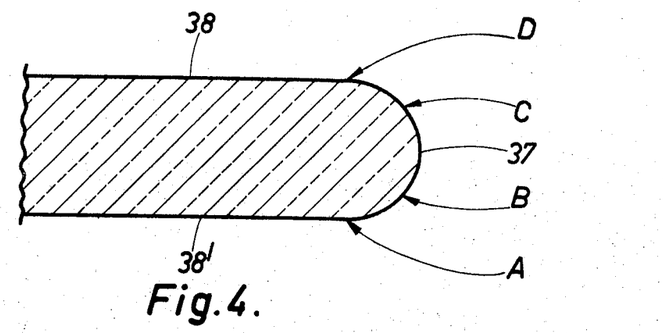

By such treatments the sheet edges were strengthened but in order further to increase the impact resistance of the edges they were further abraded in a third stage using an abrasive strip having alumina grains which would pass through a No. 400 sieve but not through a No. 500 sieve. This additional abrasive strip was used to abrade the sheets at the arris edges 36, 36′ so that these edges were practically completely removed leaving the sheets with an edge profile 37 as shown in FIG. 4. The profile comprises three sections AB, BC and CD. The section BC is an arc of a circle with a radius of curvature corresponding to that of the peripheral groove in the diamond grinding wheel. The sections AB and CD are smooth curves of somewhat smaller radius connecting the section BC with the main faces 38, 38′ of the sheet.

Figure 5:
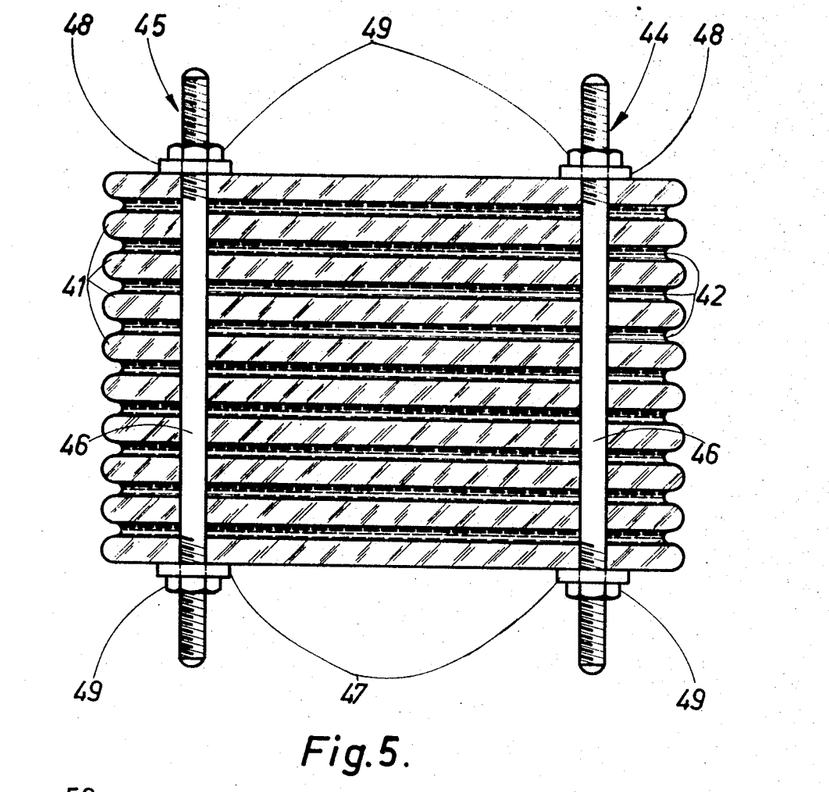
FIG. 5 is an elevation, partly in section, of a stack of clamped glass sheets prepared for a rectifying treatment.

The ten sheets 41 were then assembled, as shown in FIG. 5. The assembly of sheets 41, with interposed water films 42, were held together by means of two rust-resistant steel clamping frames 44, 45 each comprising two plates 47, 48 (one on each side of the stack of sheets) joined by two rods 46, the ends of which extended through holes in the glass plates 41. Nuts 49 were screwed onto threaded end portions of the rods 46 to force the plates 47, 48 firmly against the opposed ends of the stack. To subject the edges of the sheets 41 to a rectifying treatment, the resulting assembly of sheets was then immersed for 20 minutes in an aqueous solution containing 6% by volume sulphuric acid and 6% by volume hydrofluoric acid, the solution being at a temperature of 35° C.

After this treatment, the two outer sheets whose surfaces no longer had the required optical qualities as a result of the rectifying treatment were rejected, while the eight remaining sheets were washed and dried. These eight sheets of glass were then immersed for 30 hours in a potassium nitrate bath at a temperature of 480° C. By this chemical tempering treatment the sheets were then given a tensile strength of 70 kg./mm.$^2$.

The strengthening of the sheet edges against damage under impacts was measured using the apparatus illustrated in FIG. 1. The impacting member 1 used had a Vickers hardness of 1000 kg./mm.$^2$. The strengthening of the sheet edges was compared with that of other sheets of glass which were of identical composition and size whose edges had been abraded to the bevelled shape and which had been given the same acid and chemical tempering treatments but the edges of which had been abraded to the shapes shown in FIG. 2.

In a first test the angle between the rod 2 and the impacting member 1 was 0°. The strengthening coefficient in respect of chipping was 1.1.

In a second test the angle between the rod 2 and the impacting member 1 was 20°. The strengthening coefficient was 14.0.

In a third test the sheets were disposed in the apparatus illustrated in FIG. 1 so as to form an angle of 45° with the support 7. The angle between the rod 2 and the impacting member 1 was 25°. The strengthening coefficient in respect of chipping in this case was 10.0.

The strengthening against impacts in the direction occurring in the third test was due to the last abrasion stage in which the arris edges 36, 36′ were removed. This was established by performing the same test on a sheet having the profile shown in FIG. 3. In that case the strengthening coefficient determined by comparison with a sheet having the edge profile shown in FIG. 2 was only 1.6.

EXAMPLE 4

The rim of a soda-lime glass flower bowl having the shape of a portion of a sphere 1 m. in diameter and having a wall thickness of 10 mm. was ground to give the rim edge an arcuate profile with a radius of curvature of 6 mm. At the arris edges between the parallel main faces of the bowl wall and the rim edge the angle between each of such faces and the tangent to the edge immediately adjacent those faces was approximately 135° C.

The rim of the bowl was then subjected to a rectifying treatment by immersing it for 40 minutes in an aqueous solution comprising 6% by volume of HF and 5% by volume of $H_2SO_4$, at 22° C. The bowl was suspended upside down so that only its rim edge and a marginal zone of the bowl wall a few millimeters in width were immersed in the bath.

Lastly, the bowl was chemically tempered by immersion for 15 hours in a potassium nitrate bath at 450° C.

The reinforcement of the rim against impacts was measured using apparatus which was as illustrated in FIG. 1 except for a modification to enable the bowl to be held on the support with the rim of the bowl in a vertical plane extending through the pivot 3 of the apparatus.

The resistance of the rounded rim edge of the bowl to chipping was compared with that of a bowl having a rim edge which had been ground to a faceted bevel. The resistance to chipping was measured using an impacting member having a hardness of 2000 kg./mm.$^2$. The strengthening coefficient for an angle of 0° between the axis of the rod and the impacting member was 1.5. The strengthening coefficient for an angle of 20° between the rod and impacting member was 10.0.

EXAMPLE 5

The edges of a batch of sheets of glass of the following composition by weight:

| | Percent |
|---|---|
| $SiO_2$ | 72 |
| $Na_2O$ | 14 |
| $CaO$ | 8 |
| $MgO$ | 5 |
| $Al_2O_3$ | 1 | each sheet measuring 40 cm. x 20 cm. x 0.1 cm., were abraded by means of three endless abrasive bands coated with silicon carbide grains of sizes such that they would pass through a No. 400 sieve but not through a No. 500 sieve. The three bands were mounted so that their operative reaches were disposed in different planes for cutting the sheet edges to a three-faceted bevel. The bevelled shet edges were as shown in FIG. 6, each of the outer facets of the edge face profile making an included angle of 145° with the contiguous main face of the sheet.

The bevelled glass sheets were then chemically tempered by immersing them for 35 hours in a bath of molten potassium nitrate at 470° C.

Figure 6:
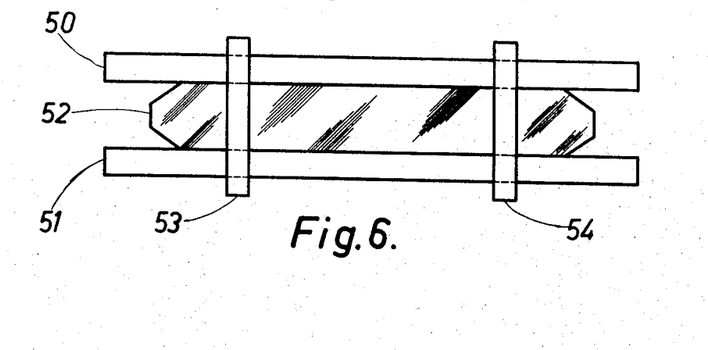
FIG. 6 is a plan view of a single sheet mounted in a shield preparatory to edge treatment of the sheet.

Following this chemical tempering treatment, each of the sheets was clamped between two stainless steel plates 50, 51 of slightly larger length and breadth dimensions than the glass sheet, as shown in FIG. 6, with the plates being held against the glass sheet by clamps 53, 54, The glass sheets, while remaining in their clamps, were immersed for 10 minutes in an aqueous solution, maintained at 20° C., comprising 6% by volume of hydrofluoric acid and 6% by volume of sulphuric acid to provide the rectifying treatment.

The stainless steel plates 50 and 51 shielded the main faces of the glass sheets from contact with the acid medium during this rectifying treatment and the acid medium made contact only with the bevelled edge faces 52 of the sheets.

After this acid rectifying treatment, the clamps were removed from the glass sheets and these sheets were washed with water and dried.

The strengthening of the edges of the glass sheets against indentation was then measured, using apparatus as described with reference to FIG. 1 in which the impacting member had a Vickers hardness of 780 kg./mm.² The results were compared with the indentation resistance, determined by identical tests, of sheets of identical size and glass composition which had been chemically tempered in the same manner but which had not been bevelled and had not been submitted to any rectifying treatment with an acid medium.

In a first set of comparative tests the impacting member was placed in line with the rod on which it was mounted. The strengthening coefficient was 1.6.

In a second set of tests, the impacting member was placed with its axis at 20° to the axis of the rod. In that case the strengthening coefficient was 5.

In a third set of tests, the impacting member was placed with its axis at 45° to the axis of the rod. The strengthening coefficient in that case was 8.

EXAMPLE 6

Figure 7:
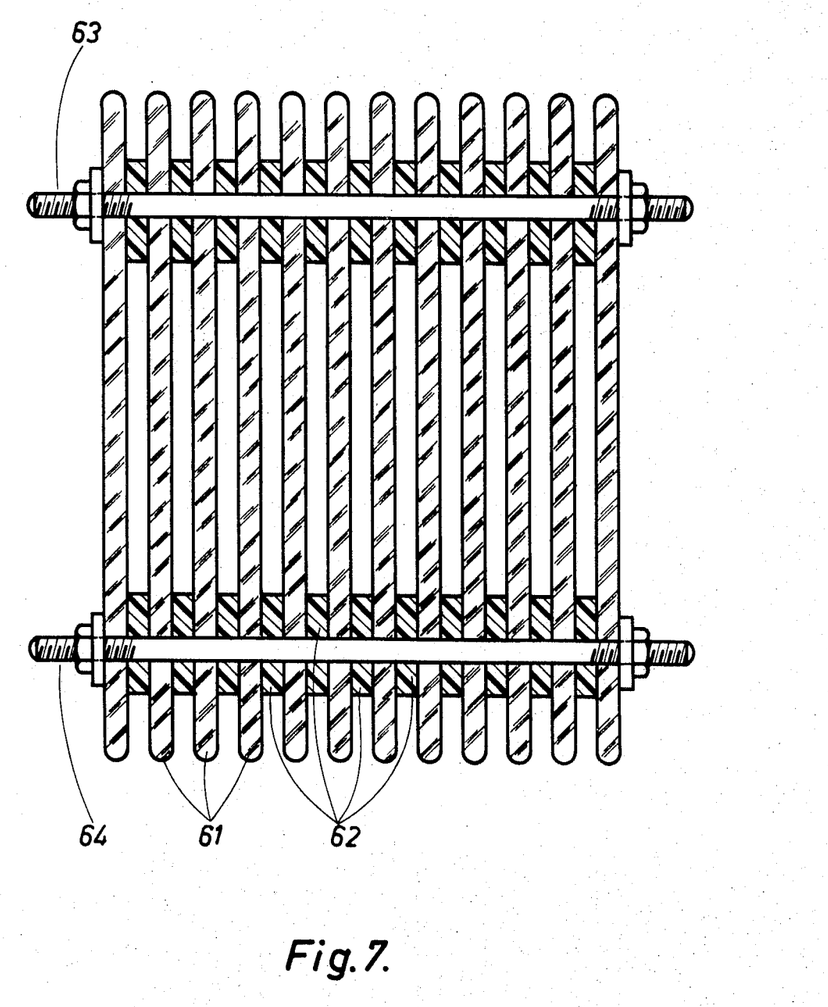
FIG. 7 is an elevation, partly in cross-section, of another assembly of clamped glass sheets prepared for a rectifying treatment.

The edges of twelve sheets of glass measuring 1 m. x 1.10 m. x 0.003 m. of the following composition (percentages by weight):

|  | Percent |
|---|---|
| $SiO_2$ | 64 |
| $Na_2O$ | 11 |
| CaO | 6 |
| MgO | 6 |
| $B_2O_3$ | 8 |
| $Al_2O_3$ | 5 | were given a rounded profile by the abrasion method used in Example 3. The twelve sheets 61 were assembled as shown in FIG. 7. Spacing strips 62 cut from sheets of rigid polyvinylchloride were disposed between the successive sheets 61. Each of the plastic strips was 4 cm. in wides and 3 mm. in thickness and the strips were disposed at a distance of 5 mm. from the adjacent edges of the sheets. The assembly was held together by two clamping frames 63, 64 analagous to those described in Example 3 with reference to FIG. 5.

The resulting assembly was immersed for 45 minutes in an aqueous solution containing 7% by volume HF and 4% by volume $H_2SO_4$ at a temperature of 22° C. to subject the sheets to a rectifying treatment.

In a variant of this method of holding the sheets assembled, the sheets of glass were held apart by intervening polyvinyl-chloride sheets slightly smaller in size than the sheets of glass so as to leave a peripheral marginal zone 5 mm. in width of each sheet exposed to contact by the acid solution.

After the acid treatment, the sheets of glass were chemically tempered by immersing the assembly of sheets in a bath composed of 40% $LiNO_3$ and 60% NaCl at 590° C. so as to cause sodium ions in the glass to be substituted by lithium ions. The ion exchange continued for 15 minutes.

The strengthening of the edges was measured using the apparatus illustrated in FIG. 1. The resistance to chipping of the edges of the sheets was compared with that of the edges of sheets identical in composition and size which had been chemically tempered in the same way but whose edges had been neither abraded nor acid treated. Use was made of an impacting member having a Vickers hardness of 1000 kg./mm.²

In a first test the impacting member was disposed in line with the rod (angle $\alpha = 0°$). The strengthening coefficient was 1.5.

In a second test the angle $\alpha$ was set at 20°. The strengthening coefficient was of the order of 100.0.

In a third test angle $\alpha$ was 45°. The strengthening coefficient was 80.0.

In the second and third tests, the comparison sheets which had unshaped edges were disposed so that the impacting member impacted against the arris edge at the side of the sheet corresponding to the cutting line.

EXAMPLE 7

The edges of sheets of glass of the following composition (percentages expressed by weight):

|  | Percent |
|---|---|
| $SiO_2$ | 72 |
| $Na_2O$ | 14.2 |
| CaO | 8.1 |
| MgO | 4.5 |
| $Al_2O_3$ | 1.2 | and measuring 30 cm. x 25 cm. x 0.2 cm. were given a rounded shape by an abrasion method described in Example 3.

The edges of the sheets were then fire polished in the following way. Each sheet was all over preheated to 450° C., whereafter its edges were exposed to a flame; during such operation, each edge was heated to 660° C. The sheet was then slowly cooled.

After this operation, the sheets were chemically tempered by spraying them with jets of $KNO_3$ at 460° C. for 25 hours.

The strengthening of th edges was measured using the apparatus illustrated in FIG. 1. A comparison was made between the resistance to chipping of the edges of these sheets and the edges of sheets of identical composition and size which had been chemically tempered in the same way but whose edges had been neither shaped nor rectified by fire polishing. Use was made of an impacting member having a Vickers hardness of 780 kg./mm.²

In a first test the impacting member was disposed in line with the rod. The strengthening coefficient was 2.0.

In a second test the angle $\alpha$ between the impacting member and the rod was 20°. The strengthening coefficient was 90.

In a third test the angle $\alpha$ was 45°. The strengthening coefficient was 80.

In the second and third tests, each sheet of glass with unshaped edges was disposed so that the impacting member impacted against the arris edge at the side of the sheet corresponding to the cutting line.

EXAMPLE 8

Figure 8:
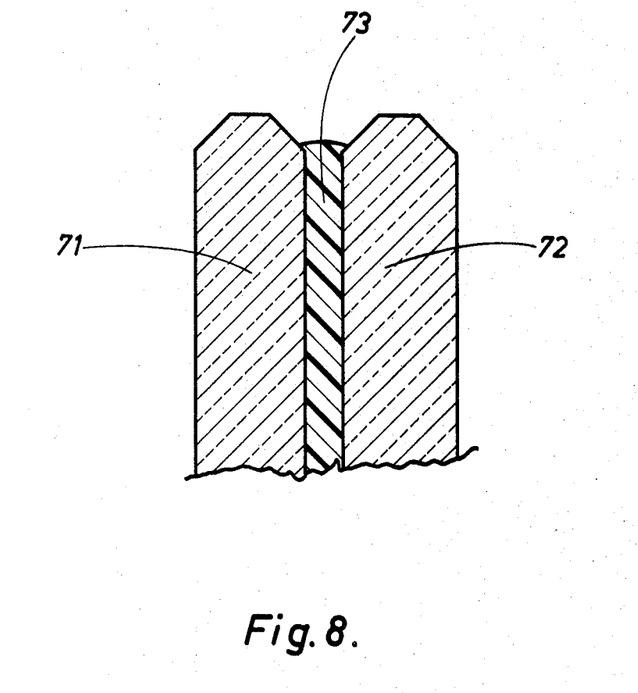
FIG. 8 is a cross-section of a portion of a laminated windshield.

The edges of two sheets of glass of the same composition as in Example 2, and measuring 100 cm. x 50 cm. x 0.2 cm. were ground to give their outline a bevelled shape, as shown in FIG. 2. To this end the sheets were treated in the same manner as the sheets of Example 2. The sheets were also subjected to the same rectifying treatment as in Example 2. The sheets which had to be assembled in order to form a windshield, a cross-section of which is shown in FIG. 8, were bent to the required curvature. Both sheets were then subjected to the same chemical tempering treatment as in Example 1. The two sheets 71 and 72 were then secured together by means of the intervening sheet 73 of polyvinyl butyral 0.76 mm. in thickness.

The strengthening of the edges of the windshield against indentation was then measured, using apparatus as described with reference to FIG. 1, in which the impacting member had a Vickers hardness of 500 kg./mm.² The result was compared with the indentation resistance, determined by an identical test of a windshield made of sheets of identical composition and treated in the same manner, but which had not been bevelled and had not been submitted to any rectifying treatment with an acid medium.

In a first test, the angle between the axis of the rod 2 and the impacting member 1 was 0°. The strengthening coefficient was 1.4.

In a second test, the angle was 45°. The impacting face of the impacting member struck one of the facets of the bevelled edge, the impacting face and the facet being parallel. The comparison windshield was so disposed in the apparatus that it was an arris edge corresponding to the cutting line of one of the sheets which sustained the impact of the impacting member. The strengthening coefficient was 85.

It will be understood that the above description and foregoing Examples of the present invention are susceptible to various modifications, changes and adaptations, and the same are intended to be comprehended within the meaning and range of equivalents of the appended claims.

What is claimed is:

1. A method of strengthening at least a portion of an edge of an article of glass comprising the steps of: abrading the surface of at least a portion of an edge of said article of glass for smoothening said surface; and, after said step of abrading, (a) subjecting the smoothened surface of the edge to a rectifying treatment which includes the contacting of at least the smoothened portion of said edge with a medium containing fluorine atoms in order to reduce the occurrence, on that surface, of flaws liable to cause stress concentrations when said edge is subjected to tensile loading and (b) chemical tempering the smoothened surface of the edge; and, preventing said medium from contacting certain portions of the surface of the article by, prior to said step of subjecting the smoothened surface of the edge to a rectifying treatment, placing a shield member over each portion of the surfaces of the article with which contact with said medium is not desired and providing a liquid film between each such shield member and the underlying surface portion to be shielded.

2. A method as defined in claim 1 wherein said glass article initially has a flat edge face and wherein said step of abrading changes said flat edge face to an edge face with a curved cross-sectional profile.

3. A method as defined in claim 2, wherein said curved cross-sectional profile extends smoothly, without corners, into the contiguous faces of the article.

4. A method as defined in claim 1 wherein said step of abrading is carried out at least in part by means of at least one flexible abrasive strip.

5. A method as defined in claim 4 wherein said step of abrading is carried out at least in part by means of at least one flexible abrasive strip incorporating grains of silicon carbide which will pass through a No. 170 sieve but not through a No. 500 sieve.

6. A method as defined in claim 1 wherein said step of abrading is carried out at least in part by a peripherally grooved grinding wheel.

7. A method as defined in claim 1 wherein said medium is an aqueous medium containing hydrofluoric acid.

8. A method as defined in claim 1 wherein said medium is an aqueous medium and additionally contains sulphuric acid.

9. A method as defined in claim 1 wherein said medium has a pH lower than 4.0.

10. A method as defined in claim 7 wherein said medium additionally contains sulphuric acid and has a pH lower than 4.

11. A method as defined in claim 1 wherein said liquid film is composed of water.

12. An article of glass having an edge of which at least one portion has been strengthened by a method as defined in claim 1.

13. An article comprising at least two sheets of glass each having edges which have been strengthened by a method as defined in claim 1, said sheets being secured together by means of an intervening organic sheet to form a laminate.

14. A method as defined in claim 1 wherein said shield members are glass sheets.

15. A method of strengthening at least a portion of an edge of an article of glass in the form of a sheet comprising the steps of: abrading the surface of at least a portion of an edge of said article of glass for smoothening said surface and for changing the cross-sectional profile of the edge of the sheet to a new cross-sectional profile such that at every point in said new profile, and at each of the extreme end points thereof corresponding to the arris edges, the angle between the left-hand and right-hand tangents to said new profile is greater than 90°; after said step of abrading, (a) subjecting the smoothened portion of the edge to a rectifying treatment, which includes the contacting of at least the smoothened portion of said edge with a medium containing fluorine atoms, in order to reduce the occurrence, on that edge surface, of flaws liable to cause stress concentrations when said edge is subjected to tensile loading and (b) chemical tempering at least the smoothened portion of the edge; and, preventing said medium from contacting at least one of the surfaces of the article by, prior to said step of subjecting the smoothened portion of the edge to a rectifying treatment, placing a plurality of such sheets, each of which has at least one abraded and smoothened edge, adjacent one another, providing a liquid film between each pair of sheets, and thereafter clamping said sheets together, whereby said medium is prevented from contacting the juxtaposed surfaces of said sheets.

16. A method as defined in claim 1 wherein said step of abrading includes changing the cross-sectional profile of said edge of the article of glass to a new cross-sectional profile such that at every point in said new profile, and at each of the extreme end points thereof corresponding to the arris edges, the angle between the left-hand and right-hand tangents to said new profile is greater than 90°.

References Cited

UNITED STATES PATENTS

| Number | Date | Name | Class |
|---|---|---|---|
| 3,301,649 | 1/1967 | Marwsak | 65—30 |
| 2,371,486 | 3/1945 | Walker | 65—61 X |
| 3,607,485 | 9/1971 | Bailey et al. | 65—31 X |
| 3,660,060 | 5/1972 | Spanoudis | 65—30 |
| 3,615,322 | 10/1971 | Bogart et al. | 65—30 |
| 2,725,691 | 12/1955 | Sommer et al. | 51—135 R |
| 2,685,821 | 8/1954 | Tillyer et al. | 65—61 |
| 2,782,569 | 2/1957 | Robbins | 51—283 X |
| 2,409,108 | 10/1946 | Crowley | 51—283 X |
| 2,626,363 | 1/1953 | Holmbeck | 51—283 X |
| 2,748,541 | 6/1956 | Connell | 51—101 LG |
| 3,071,455 | 1/1963 | Harman | 65—61 UX |
| 2,723,506 | 11/1955 | Paynton | 51—135 R |
| 3,514,908 | 6/1970 | Herbert et al. | 51—323 X |
| 2,710,496 | 6/1955 | Okey | 51—101 LG |
| 3,549,344 | 12/1970 | Loukes et al. | 65—30 |
| 230,137 | 7/1880 | Lapham | 156—24 |
| 3,573,948 | 4/1971 | Tarnopol | 65—30 X |
| 3,004,368 | 10/1961 | Hicks | 65—31 X |
| 3,396,075 | 8/1968 | Morris | 65—30 X |
| 1,966,817 | 7/1934 | Hanx | 65—30 UX |

FOREIGN PATENTS

| 304,539 | 1/1929 | Great Britain | 65—30 |

OTHER REFERENCES

S. S. Kistler, "Stresses in Glass Produced by Nonuniform Exchange of Monovalent Ions," April 1961, pp. 59–68, class 65–30.

Glass Manna, Pittsburgh Plate Co., 1946, sections F. 1 and F. 2.

S. LEON BASHORE, Primary Examiner

K. M. SCHOR, Assistant Examiner

U.S. Cl. X.R.

65—30, 31, 61; 156—24; 161—1